United States Patent [19]
Cristie

[11] 3,861,234
[45] Jan. 21, 1975

[54] BRAKE LEVERS FOR BICYCLES
[75] Inventor: Martin Cristie, Brooklyn, N.Y.
[73] Assignee: Stelber Industries Inc., Valley Stream, N.Y.
[22] Filed: May 29, 1973
[21] Appl. No.: 364,232

[52] U.S. Cl. .................. 74/480 R, 74/489
[51] Int. Cl. .................. B62k 23/06, B62l 3/02
[58] Field of Search .................. 74/480 R, 488, 489

[56] References Cited
UNITED STATES PATENTS
| | | | |
|---|---|---|---|
| 3,403,577 | 10/1968 | Ozaki | 74/489 X |
| 3,596,530 | 8/1971 | Yoshigai | 74/489 X |
| 3,719,104 | 3/1973 | Dian | 74/489 |
| 3,752,005 | 8/1973 | Yoshikawa | 74/489 X |
| 3,776,061 | 12/1973 | Kiyokazu | 74/489 X |

*Primary Examiner*—Allan D. Herrmann
*Attorney, Agent, or Firm*—Robert I. Pearlman

[57] ABSTRACT

Brake levers for bicycles, according to which there are auxiliary brake levers in addition to primary brake levers. The auxiliary brake levers have pivot axes different from the primary brake levers and can be interchangeably arranged in such a way that the distance of the auxiliary brake levers from part of a handlebar can be regulated.

7 Claims, 6 Drawing Figures

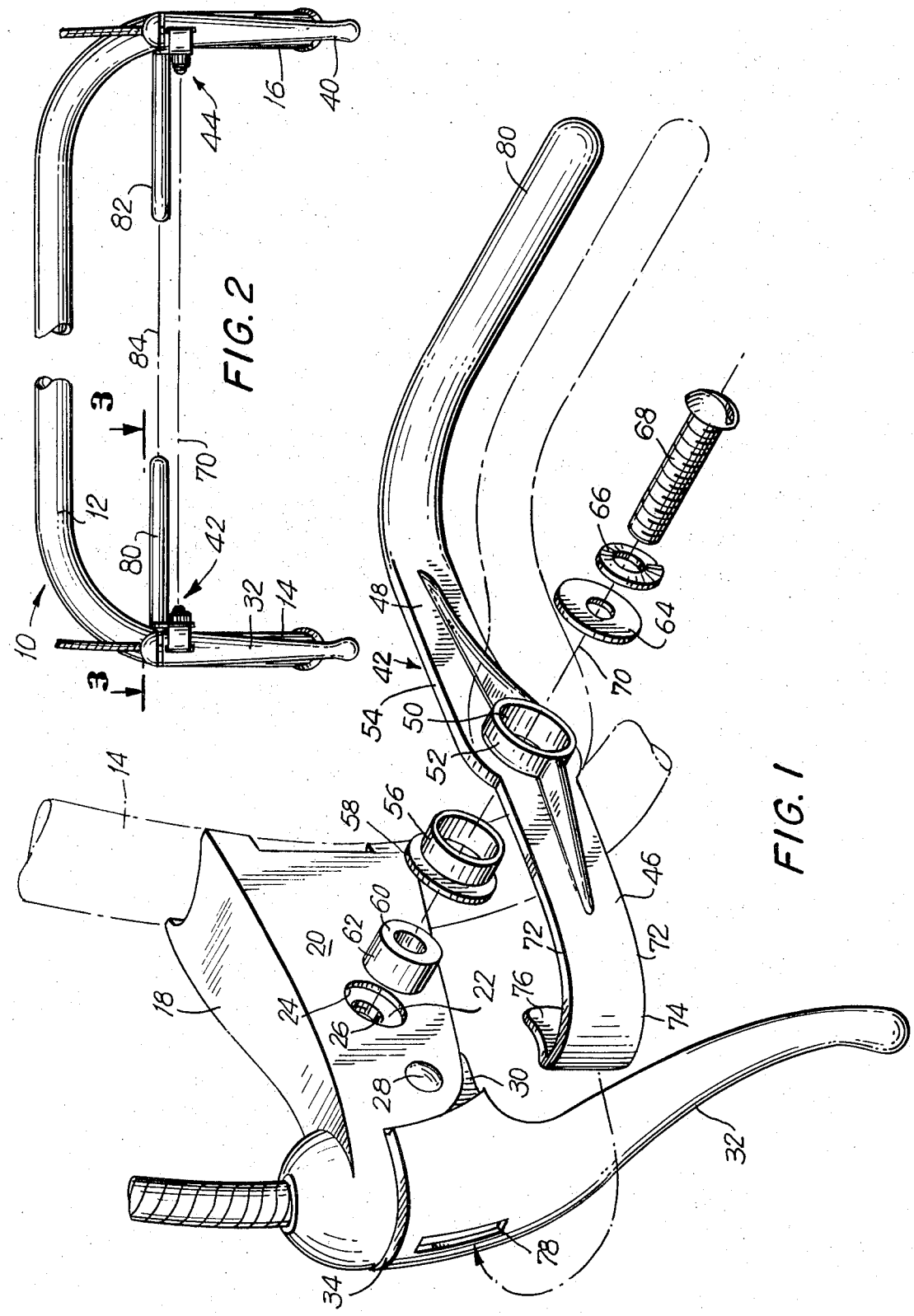

BRAKE LEVERS FOR BICYCLES

BACKGROUND OF THE INVENTION

The present invention relates to bicycles.

In particular, the present invention relates to bicycles in which the brakes are operated by hand levers through suitable Bowden cable systems.

With bicycles of this type, particularly racing bicycles, the brake levers are conventionally arranged at a location situated forwardly of the forwardmost portions of the U-shaped ends of the handlebar. Therefore, in order to operate the brake levers the hands of the operator must be located at these forwardmost parts of the handlebar.

However, depending upon the particular conditions under which the bicycle is operated, the hands of the operator may not conveniently be located at these forwardmost parts of the U-shaped ends of the handlebar in order to operate the brake levers. On certain types of terrain and when operating at certain speeds the operator will feel far safer and far more secure if he situates his hands at the intermediate straight, horizontal portion of the handlebar which extends between the U-shaped ends thereof. However, when the hands of the operator are located on this intermediate straight horizontal portion of the handlebar they are situated too far from the brake levers so that these levers cannot be conveniently operated at this time. Of course, the operator can shift his hands along the handlebar in order to reach the brake levers, but under operating conditions where it is more comfortable for the operator to locate his hands on the intermediate horizontal portion of the handlebar a certain instability and dangerous condition may result if the operator shifts his hands in this way.

SUMMARY OF THE INVENTION

It is accordingly a primary object of the present invention to provide a solution to the above problem.

In particular, it is an object of the invention to provide for a bicycle a pair of auxiliary brake levers which can conveniently be manipulated from the intermediate horizontal portion of the handlebar, so that the operator need not displace his hands from this latter portion of the handlebar in order to operate the brakes.

A further object of the present invention is to provide a construction which requires only exceedingly simple and inexpensive alterations in conventional structures in order to enable them to utilize the auxiliary brake levers of the invention.

Furthermore, it is an object of the present invention to provide a construction of this type which enables a pair of auxiliary levers to be interchangeably connected with the primary brake levers.

In particular, it is an object of the present invention to provide a construction of this latter type according to which a choice of assembly of the auxiliary levers with the primary levers can be made in such a way that the distance between the horizontal intermediate part of the handlebar and the parts of the auxiliary levers which are to be grasped can be regulated.

According to the invention the pair of auxiliary levers are pivotally connected with brackets which carry the primary levers, and each auxiliary lever has an outer arm extending from its pivot axis alongside of the primary lever with this outer arm having a construction which is symmetrical with respect to a plane which contains the pivot axis of the auxiliary lever. An interconnecting means is provided for interconnecting the outer arm of each auxiliary lever with a primary lever in such a way that both of the interconnected levers must turn together. Because of symmetrical arrangement of the outer arms of the auxiliary levers they can be interchangeably connected with the primary levers. The auxiliary levers have inner arms which terminate in elongated free end portions which extend parallel to the horizontal intermediate portion of the handlebar, and these free end portions of the inner arms of the auxiliary levers may be located either at an elevation higher than or at an elevation lower than the pivot axis of each auxiliary lever, so that in this way it becomes possible to select between at least two different distances between the horizontal part of the handlebar and the free end portion of the auxiliary lever which is to be grasped by the operator.

BRIEF DESCRIPTION OF DRAWINGS

The invention is illustrated by way of example in the accompanying drawings which form part of this application and in which:

FIG. 1 is a perspective illustration of a primary brake lever and bracket shown assembled with part of a handlebar which is fragmentarily illustrated in phantom lines, the auxiliary lever of the invention being shown with the components for connecting the same to the bracket in an exploded view, and FIG. 1 further illustrating in phantom lines part of an auxiliary lever different from that which is shown in solid lines in FIG. 1;

FIG. 2 is a fragmentary front elevation of the pair of primary and auxiliary levers as they are seen when looking toward the bicycle from a point situated in front of the bicycle;

DESCRIPTION OF A PREFERRED EMBODIMENT

Figure 3:
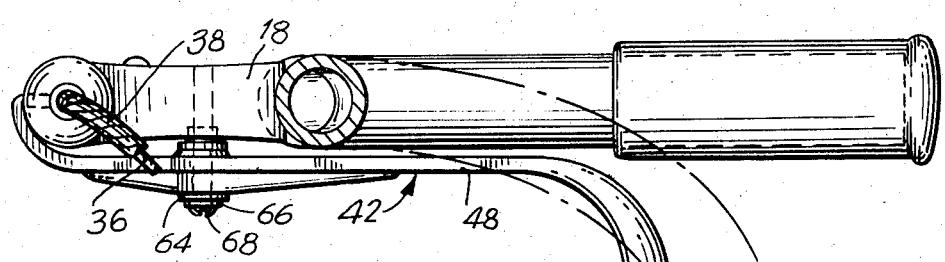
FIG. 3 is a top plan view of the assembly of the invention at one end region of the handlebar, with part of the handlebar shown in phantom lines fragmentarily.

Referring first to FIG. 2, there is fragmentarily illustrated therein a handlebar 10 of a bicycle, this handlebar 10 having an intermediate horizontal portion 12 and a pair of U-shaped end portions 14 and 16 which extend downwardly and forwardly from the intermediate portion 12. The manner in which the portion 14 extends downwardly and forwardly from the intermediate portion 12 is particularly apparent from FIG. 4, and the portion 16 is a mirror image of the portion 14. Part of the U-shaped end portion 14 of the handlebar 10 is illustrated in FIG. 1 in phantom lines. Shown in FIG. 1 is a bracket means 18 which is fixed in any suitable way to the portion 14 projecting forwardly therefrom, this bracket means 18 being fixed to the forwardmost part of the portion 14, as is apparent from FIG. 4. A corresponding bracket means is fixed in the same way to the u-shaped end portion 16 of the handlebar 10.

The bracket means 18 is in the form of a casting having surface 20 formed with countersunk opening 24. For a purpose which is referred to below the bracket means 18 is formed with a threaded opening 26 having a diameter smaller than the opening 24.

Across a slot of the bracket means 18 extends a pivot pin 28 which is fixedly carried by the bracket means 18 and which extends through a portion 30 of a primary brake lever 32. Thus, this primary brake lever 32 is supported for swinging movement on the pivot pin 28. At its end 34 the primary brake lever 32 is connected with the inner wire 36 (FIG. 3) of a Bowden cable which has an outer sheath 38 in which the wire 36 can move. Thus, in a well known manner the operator can manipulate the brake lever 32 in order to apply a brake. The U-shaped portion 16 carries an identical assembly having a primary brake lever 40, and when the operator's hand is at the U-shaped portions 14 and 16, as shown at the lower part of FIG. 4, the operator can conveniently manipulate the primary brake lever 32 as well as the primary brake lever 40 in order toswing them inwardly toward the U-shaped portions 14 and 16, respectively, in order to apply brakes to the front and rear wheels, for example, as is well known.

In accordance with the present invention there are a pair of auxiliary brake levers 42 and 44 which are respectively connected operatively with the primary brake levers 32 and 40.

Figure 4:
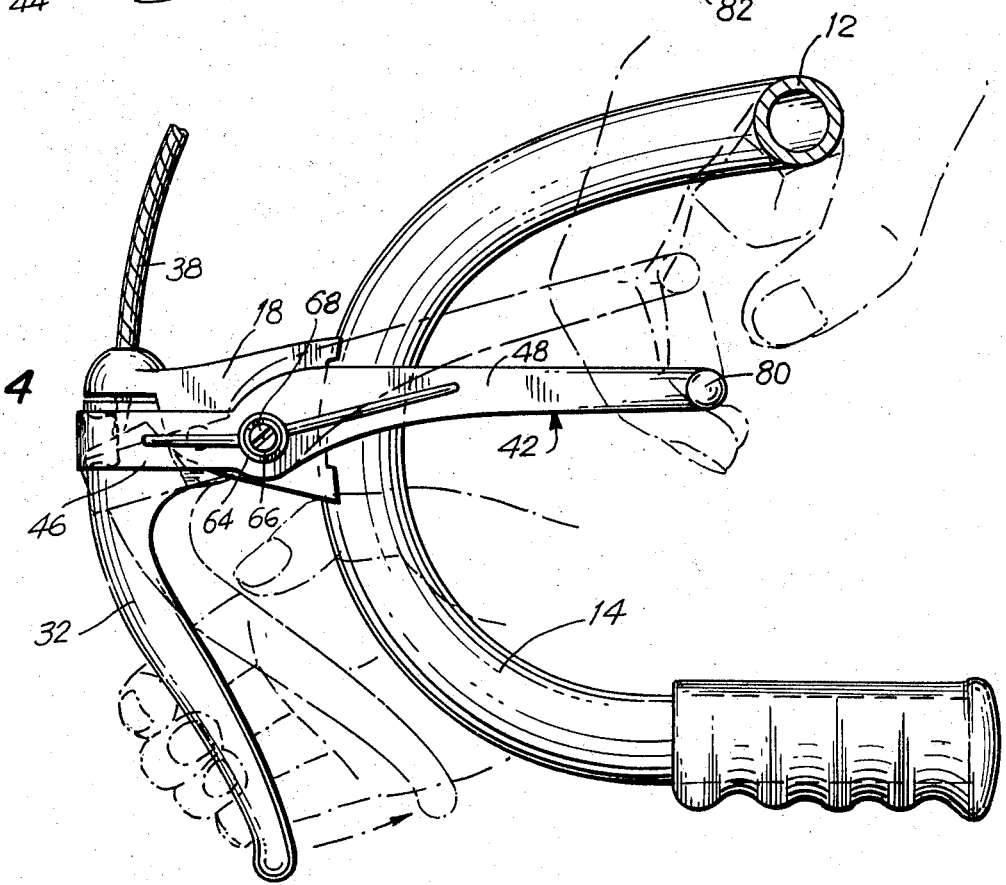
FIG. 4 is a side view of the structure of FIG. 3.

As is shown most clearly in FIGS. 1 and 4, the auxiliary lever 42 has an outer arm 46 and an inner arm 48. Between these arms the lever 42 is formed with an axial bore 50 defined by the cylindrical flange 52 which forms an extension of an opening which passes through the wall 54 of the lever 42 and which forms an extension of the bore 50. The bore 50 receives a bearing sleeve 56 which has a flange 58 adapted to be situated close to the wall 20 in engagement with an end 60 of a bushing 62 made of steel or aluminum. The bearing sleeve 56 is made of nylon, for example.

In the illustrated example the countersunk bore 24 formed in the bracket casting 18 receives against its inner surface 22 the end of the bushing 62 opposite from the end 60 which is visible in FIG. 1, and the bore of the bushing 62 has a diameter at least as great as the diameter of the threaded bore 26 which is formed in the casting 18. After the bushing 62 is inserted into the recess 24 the outer sleeve 56 is placed on the part of the bushing 62 which projects inwardly from the inner surface 20 of the bracket 18, and then the outer surface of the bushing 56 is received in the interior of the bore 50. A washer 64 is placed against that end of the cylindrical part 52 which is visible in FIG. 1, and a lock washer 66 is placed against the washer 64. Then a bolt 68 is extended through the aligned openings of the washers 64 and 66 as well as the bushing 62 and threaded into the bore 26 until the parts are in the assembled condition providing the auxiliary lever 42 with a pivot axis 70 which is indicated in FIG. 1 and which is a common axis of the pivot bore 26, the bushing 62, the bearing 56, and the bolt 68.

The outer arm 46 has a construction which is symmetrical with respect to a plane which contains the pivot axis 70 and which is situated midway between the opposed side edges 72 of the outer arm 46. This outer arm 46 terminates in a substantially U-shaped portion 74 which extends alongside the primary brake lever 32 and which terminates in a tongue 76. The brake lever 32 is formed with a slot 78 into which the tongue 76 is inserted when the parts are assembled. Thus, the slot 78 and the tongue 76 form a means for interconnecting the auxiliary 42 with the primary lever 32 so that these levers must turn together, although these levers have separate pivot axes formed by the pin 28 and the bolt 68 which are spaced from each other. The lever 44 is assembled in the same way with respect to the primary lever 40, these levers being connected to a bracket means which has the same construction as the bracket means 18.

The thinner lever arm 48 of the auxiliary lever 42 is of a substantially L-shaped configuration and terminates in an elongated free end portion 80 which extends parallel to the intermediate straight horizontal portion 12 of the handlebar 10. As is shown particularly in FIG. 4, the inner arm 48 of the auxiliary lever 42 is upwardly curved at the region of the pivot bolt 68, and the free end portion 80 of the auxiliary 42 is situated in the illustrated example at an elevation higher than the bolt 68. The auxiliary lever 44 is a mirror image of the lever 42 and terminates at its inner arm in an elongated free portion 82 which extends inwardly toward the elongated free end portion 80 and which has a common axis therewith, as is shown particularly in FIG. 2.

Thus, with this construction when the hands of the operator are on the intermediate horizontal straight portion 12 of the handlebar 10, the operator can grasp the free end portions 80 and 82 of the auxiliary levers 42 and 44 and manipulate them in the manner indicated for the auxiliary lever 42 in FIG. 4.

By providing for the auxiliary levers 42 and 44 pivot axes which are different from the pivot axes of the primary levers 32 and 40, the connections of the latter to the brackets need not be disturbed. The only modification which is required in the primary levers is that they be provided with the slots, such as the slots 78, for receiving the tongue 76 at the end of the inner arm of each auxiliary lever.

Figure 5:
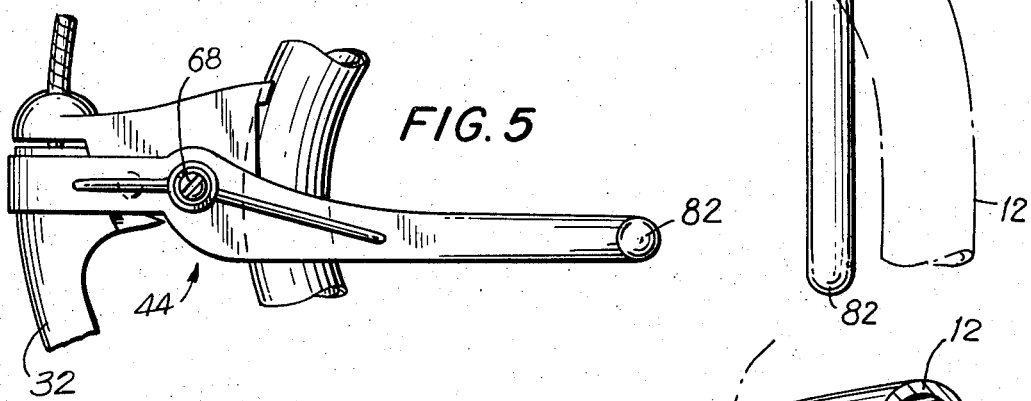
FIG. 5 shows the structure of FIG. 4 when the auxiliary lever of FIG. 4 is interchanged with the auxiliary lever from the other end of the handlebar.

Moreover, because each outer arm of each auxiliary lever is symmetrical with respect to a plane which contains the pivot axis, the pair of auxiliary levers are interchangeable so that if desired instead of connecting the auxiliary levers 42 and 44 respectively with the primary levers 32 and 40, the lever 44 can be connected with the lever 32 and the lever 42 can be connected with the lever 40. Thus, as is shown in FIG. 5, where the lever 44 is shown connected with the primary lever 32, the elongated free end portion 82 of the lever 44 will in this case be located at an elevation lower than the bolt 68. Thus, referring to FIG. 2, it will be seen that with the assembly illustrated therein the common axis 84 of the elongated free end portions 80 and 82 is situated at an elevation higher than the common axis 70 of the auxiliary levers 42 and 44. By interchanging the auxiliary levers so that the lever 44 is connected to the lever 32, as shown in FIG. 5, while the lever 42 is connected to the lever 40, this common axis 84 of the elongated portions 80 and 82 will be situated at an elevation lower than the axis 70. In this assembled condition the elongated free end portions 80 and 82 are situated at a greater distance from the intermediate straight portion 12 of the handlebar. Thus, an operator with relatively large hands may find it more comfortable to operate the auxiliary levers when they have an arrangement as shown in FIG. 5 where the free end portions 80 and 82 are situated at an elevation lower than the axis 70. Where the operator has smaller hands he may prefer arrangement as shown in FIG. 4 and described above.

Figure 6:
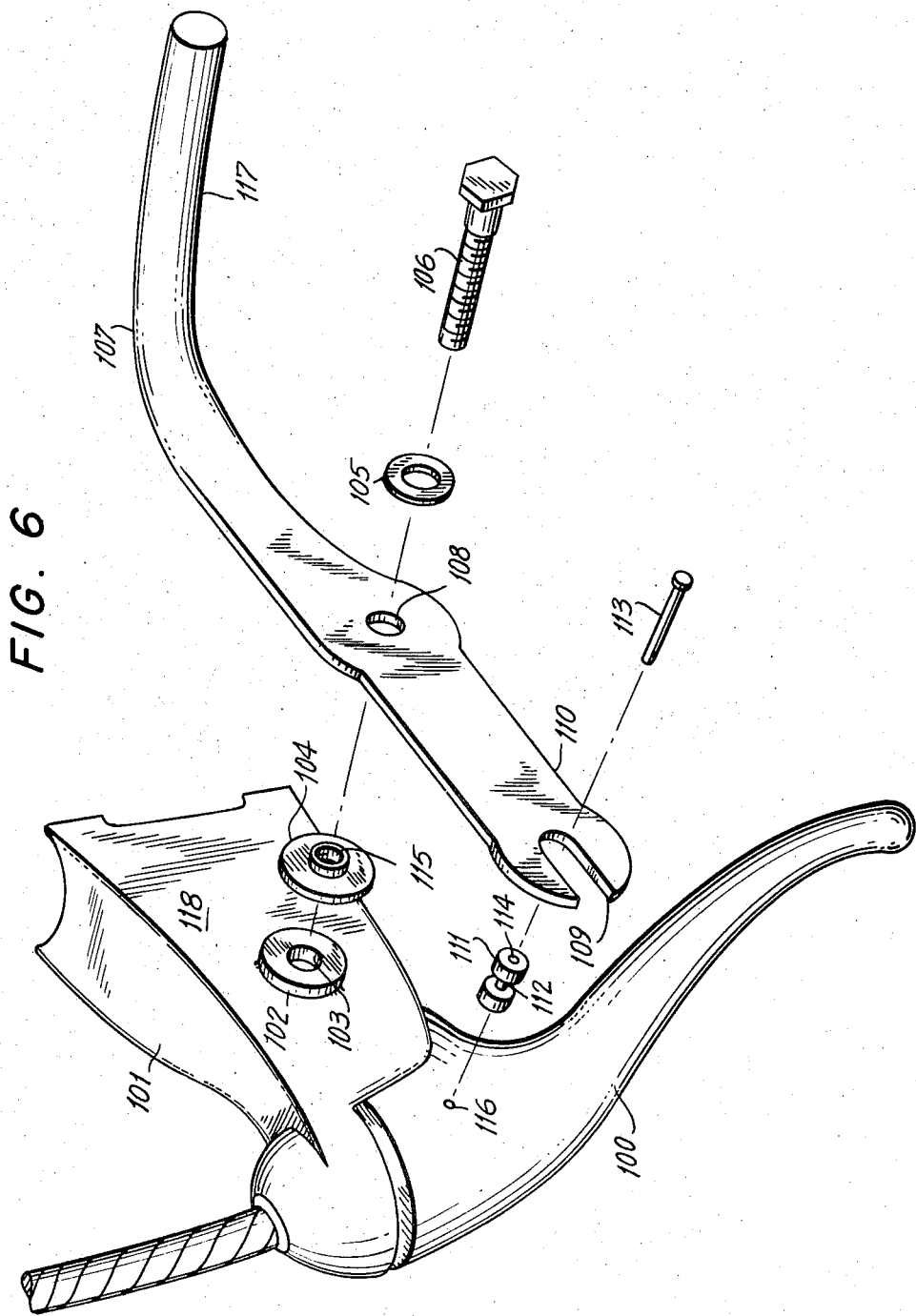
FIG. 6 shows an alternate embodiment for interconnecting the auxiliary brake lever to the primary brake lever.

FIG. 6 is a perspective of an alternate embodiment of the present invention wherein the auxiliary and primary brake levers are interconnected by means of mouth 109 of auxiliary arm 107 which grips recess 112 of bushing 111 fixed to the primary brake lever 100 rather than the tongue 76 - slot 78 connection of FIG. 1.

More particularly, as shown in FIG. 6, bushing 111 having a central recessed portion 112 is fixed to the primary brake lever 100 by means of pin 113 adapted to be placed through opening 114 into hole 116. Face 118 of bracket 101 has positioned thereon bushing 102. Bushing 104 is adapted to be placed against element 102 and serving as a fulcrum for auxiliary brake lever 107 when bolt 106 is in position and passes through washer 105, arm opening 108 and the bores 103 and 115 of bushings 102 and 104, respectively.

Mouth 109 of outer arm 110 of the auxiliary brake lever 107 moves about recess 112 in bushing 111. There is sufficient friction between the walls surrounding mouth 109 and recess 112 due to their relative size and materials of construction so that movement of the auxiliary arm by the rider pressing inner brake lever arm 117 is translated into the movement of the primary brake lever 100 thus actuating the braking system to operate. Typically bushing 111 is made of nylon, but other materials offering the necessary gripping effect can be used.

The auxiliary brake levers are symmetrically mounted and interchangeably connected, as was described previously relative to the other embodiments of the present invention.

Thus, with the exceedingly simple and inexpensive structure of the invention it is possible to assemble with conventional brake lever brackets auxiliary levers which permit the brakes to be operated from the intermediate straight portion of the handlebar with the distance between the auxiliary levers and the straight portion being adjustable at least to the extent that the free end portions 80 and 82 can be situated closer or more distant from the straight portion 12 of the handlebar.

What is claimed is:

1. For use in a bicycle which has a handlebar provided with an intermediate straight horizontal portion and a pair of opposed substantially U-shaped end portions projecting forwardly and downwardly from said intermediate horizontal portion, a pair of bracket means respectively fixed to and projecting forwardly from said U-shaped portions of said handlebar, a pair of primary brake levers respectively pivotally carried by said pair of bracket means and extending downwardly therefrom and situated forwardly of said U-shaped portions of said handlebar, and a pair of auxiliary brake levers pivotally connected to said pair of bracket means at inner side surfaces thereof which are directed toward each other, each of said auxiliary levers being connected respectively to said pair of bracket means for swinging movement with respect thereto about a predetermined axis and having an outer arm extending from the latter axis toward the primary brake lever and situated in part beside the same, each primary brake lever and outer arm of each auxiliary lever situated beside the same carrying an interconnecting means for interconnecting a primary brake lever and an auxiliary brake lever for movement together, and each auxiliary lever having an inner arm extending from its pivot axis in the direction opposite to said outer arm and terminating in an elongated free end portion extending substantially parallel to said horizontal straight portion of the handlebar at a distance close enough to said horizontal straight portion of said handlebar to be grasped by the hand of an operator when the hand is on the horizontal straight portion of the handlebar, so that the primary levers can also be turned by turning of the auxiliary levers, each outer arm of each auxiliary lever being symmetrical with respect to a plane which contains the pivot axis of each auxiliary lever so that the auxiliary levers may be interchangeably connected with the brackets and primary levers and arranged with said free end portions of said inner arms extending toward each other.

2. The combination of claim 1 and wherein said primary levers respectively have with respect to said pair of bracket means, respectively, pivot axes which are different from the pivot axes of said auxiliary levers.

3. The combination of claim 2 and wherein the pivot axes of said primary levers are at least substantially coincident with each other while the pivot axes of said auxiliary levers are also substantially coincident with each other and spaced from while extending parallel to the axes of said primary levers.

4. The combination of claim 3 and wherein said interconnecting means interconnecting each primary lever and an auxiliary lever includes a slot formed in a wall portion of the primary lever and a substantially U-shaped free end portion at the outer arm of each auxiliary lever terminating in a tongue which extends into said slot.

5. The combination of claim 3 and wherein said inner arms of said auxiliary levers are mirror images of each other and are arranged with said elongated free end portions thereof situated at an elevation different from the pivot axis of each auxiliary lever, so that said auxiliary levers may be selectively connected with the pair of bracket means in such a way that the free end portions of said inner arms are either at an elevation higher than or at an elevation lower than the elevation of the pivot axis of the auxiliary levers, thus providing the possibility of situating the free end portions of said inner arms either closer to or distant from the horizontal intermediate portion of the handlebar.

6. In a bicycle brake operating device adapted to be secured to a drop type bicycle handle having main brake lever means for operating the brake of a bicycle, and auxiliary brake lever means in interconnecting engagement with said main brake lever means whereby the brakes on the bicycle may be effectively operated by either lever, the improvement which comprises each outer arm of each auxiliary brake lever being symmetrical with respect to a plane which contains the pivot axis of each auxiliary lever so that the auxiliary levers can be interchangeably connected to said main lever.

7. The improvement of claim 6 wherein said auxiliary brake lever is interconnected to said main lever by its terminal end gripping an appendage fixed to the side of said main lever causing the latter's movement with the movement of the auxiliary lever about its pivot axis.

* * * * *